March 28, 1967 — R. H. BAUMAN — 3,310,944
MASTER CYLINDER
Filed May 3, 1965
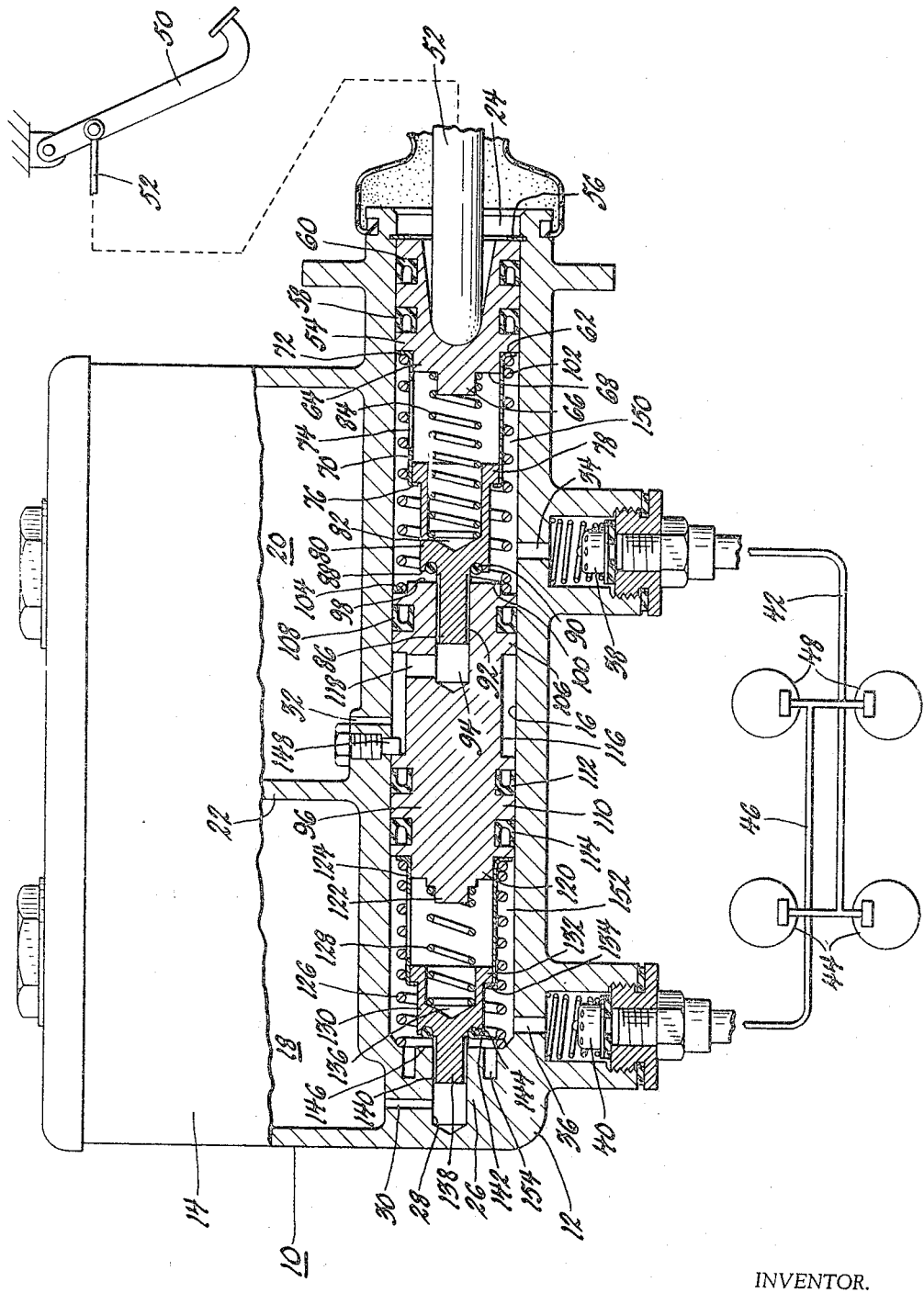
INVENTOR.
Robert H. Bauman
BY
D. D. McGraw
HIS ATTORNEY United States Patent Office 3,310,944
Patented Mar. 28, 1967

3,310,944
MASTER CYLINDER
Robert H. Bauman, Dayton, Ohio, assignor to General Motors Corporation, Detroit, Mich., a corporation of Delaware
Filed May 3, 1965, Ser. No. 452,643
6 Claims. (Cl. 60—54.6)

The invention relates to a master cylinder, and more particularly to a master cylinder of the split system type which does not require bypass holes. A master cylinder assembly embodying the invention eliminates the necessity of having cup-like seals sliding across open apertures with a pressure being exerted against the seals which tends to extrude them into the apertures. Features of the invention include a piston valve and seal arrangement wherein pressure may be built up against a valve and a floating piston to seal off a pressurizing chamber, and the pressure of the fluid in the pressurizing chamber causes a valve and floating piston to move, which in turn causes pressurization in another chamber and causes another valve to close so that pressure may be built up in the other chamber. The pressurizing chambers are connected so as to introduce pressure into separate fluid pressure operating systems. The master cylinder will permit either fluid system to remain operative and be pressurized should a failure occur in the other system. Another important feature of the invention is in the provision of a positive and confined valve seal arrangement which closes off a port in order to permit pressurization of the fluid in a pressurizing cylinder. A novel valve and valve control arrangement is provided as a part of the invention. By utilizing the invention, and particularly by elimination of bypass holes, a less expensive master cylinder may be manufactured. This eliminates drilling operations required in manufacturing master cylinders of the type now commonly used, as well as other operations such as vapor blasting, peening or other finish treatment of burrs on such holes. Many of the components will require less critical machining and the resulting master cylinder assembly will also be more reliable. Each system which is pressurized by the master cylinder assembly is fully compensated.

In the drawing:

A schematic representation of a vehicle brake system including a master cylinder assembly embodying the invention is shown, with portions of the master cylinder assembly being broken away and in section.

The master cylinder assembly 10 includes a housing or body 12 which is formed to provide a reservoir 14 and a cylinder bore 16. Reservoir 14 is preferably divided into chambers 18 and 20 by a dividing wall 22. Wall 22 may extend the full depth of the reservoir so that the chambers are entirely separate, or may extend upwardly for only a portion of the depth of the chamber so that the upper portions of the chambers are joined. The provision of separate chambers minimizes fluid loss for the two separate systems to be actuated by the assembly.

Bore 16 has an open end 24 and a closed end 26. At the closed end of the bore a reduced bore section 28 provides a valve guide and a compensation passage. A port 30 formed in the housing provides fluid communication between the reservoir chamber 18 and the bore section 28. A port 32 in the housing positioned generally in the center section of the bore provides fluid communication between the bore 16 and chamber 20 of the fluid reservoir. A fluid pressure outlet port 34 is provided in a suitable part of the housing so that fluid pressure may be conducted out of one of the pressurizing chambers to be described. A similar fluid pressure outlet port 36 is provided adjacent the bore end 26 for the other fluid pressurizing chamber to be described. Residual pressure check valves 38 and 40, which may be of any well known design, are associated with ports 34 and 36. When the master cylinder assembly embodying the invention is utilized in a brake system, as illustrated, the front brake line 42 is connected to port 34 through the residual pressure check valve 38 and leads to vehicle front brakes 44. The rear brake line 46 is connected to port 36 through residual pressure check valve 40 and leads to the rear brakes 48. In a vehicle embodying a brake system utilizing the master cylinder assembly 10, the usual brake pedal 50 is provided for brake actuation. The braking system is schematically illustrated as including a push rod 52 directly connected to the brake pedal. It is to be understood, however, that a brake booster or full power brake apply mechanism of any type known in the art may be utilized intermediate the brake pedal and the push rod 52.

A primary piston 54 is reciprocably received in the rear or open end of bore 16 and in the released position has its rear end abutting against retainer 56. Push rod 52 acts on primary piston 54 and is, therefore, in engagement with the piston as illustrated. Primary piston 54 is provided with suitable sealing means such as the annular V-block seals 58 and 60. These seals engage the wall of bore 16 and effectively prevent the loss of fluid. The forward end of primary piston 54 has a face 62 formed by providing a reduced diameter section 64. A further reduced diameter section 66 on the piston provides a second face 68. A valve retractor 70, formed as a cylindrical cage-like member, is received about the first reduced diameter section 64 and has an outwardly extending flange 72 which abuts face 62. The main body of the valve retractor 70 extends forwardly of piston 54. It is provided with suitable apertures 74 which permit free flow of fluid through the retractor. The forward end of the retractor has an inwardly turned flange 76 which cooperates with a flange or land 78 formed on a valve 80. Valve 80 is positioned within the bore 16 forwardly of the primary piston 54, and its land 78 is received within the valve retractor 70.

Valve 80 is recessed at 82 so that a spring seat is provided for one end of spring 84. The other end of spring 84 is seated against face 68 of the primary piston and is guided in place by the reduced diameter section 66 of the primary piston. Valve 80 is substantially smaller in diameter than the diameter of bore 16. The forward end of the valve is provided with a reduced diameter section 86 so that a valve face or shoulder 88 is formed. A recess in face 88 receives an O-ring seal 90. The reduced diameter section 86 is provided with a plurality of axially extending surface grooves 92 and extends within a valve guide and fluid compensation passage 94 formed in a secondary or floating piston 96 also reciprocably received within bore 16.

The rear end of piston 96 is formed about passage 94 to provide an annular valve seat 98 which is in axial alignment with seal 90 and the face of valve 88 so that it may be engaged by the seal and, if the seal is sufficiently compressed, by the valve face 88. The portion of the piston 96 on which seat 98 is formed is a reduced diameter section 100 which acts as a guide for the forward end of a spring 102. The forward end of spring 102 is seated against a face 104 formed on the rear end of piston 96. The rear end of spring 102 engages flange 72 of the valve retractor and is, therefore, operatively engaging face 68 of the primary piston 54. Spring 102 acts in compression to urge pistons 54 and 96 apart. Spring 84 acts in compression, with lesser force than spring 102, to urge valve 80 toward piston 96. However, in the released position, flange 76 of the valve retractor is engaged by the forward side of land 78 of the valve and prevents the valve from moving into valve seating engagement with the seat 98. This is the position shown in the drawing. The rear portion of floating valve 96 includes a land 106 in which a V-block piston seal 108 is provided to seal the rear end of the piston. The forward end of the piston 96 is provided with a land 110 which receives a pair of oppositely disposed V-block seals 112 and 114. The annular groove 116 provided intermediate lands 106 and 110 provides a part of a fluid communication path between the reservoir chamber 20 and the passage 94 of the piston. Passage 118 is provided in this piston to connect groove 116 with passage 94.

The forward end of piston 96 has a first reduced diameter section 120 and a second further reduced diameter section 122 which are generally comparable to sections of the forward end of primary piston 54. A valve retractor 124 similar to valve retractor 70 is provided at the forward end of piston 96, as are springs 126 and 128 which are respectively similar to springs 102 and 84. A valve 130 having a construction similar to valve 80 is also provided forwardly of piston 96. Valve 130 has a land or flange 132 cooperating with the forward inwardly turned flange 134 of the valve retractor 124, and is received within the valve retractor cage. Valve 130 is recessed at 136 to provide a seat for spring 128. The forward end of valve 130 has a reduced diameter section 138 which extends into the reduced bore section 28 so that the bore section acts as a valve guide. Valve section 138 has axially extending surface grooves 140 similar to the grooves 92 of valve 80. The valve is also provided with a similar valve face 142 and valve seal 144. The end 26 of the bore 16 provides a similar seat 146 about passage 28 which is aligned so as to be engageable by valve seal 144. In the released position, however, spring 126 urges piston 96 rearwardly while spring 128 urges valve 130 forwardly relative to the piston direction limit of valve travel permitted by the valve retractor 124. The arrangement is such that the valve seal 144 is spaced from seat 146. The precise released position of the floating piston 96 is obtained by the use of a stop pin 148 which is provided in the housing 12 and extends into the piston groove 116. Thus in the released position, the rear end of piston land 110 engages the pin so that the piston is precisely positioned. When the piston is moved sufficiently forward in a manner to be described, the forward edge or shoulder of land 106 engages the pin 148 to limit the forward movement of piston 96 to a maximum predetermined amount. It should be noted at this point that port 32 is provided adjacent stop pin 148 so that it is covered by the forward portion of land 106 and seal 108 does not at any time extend across the end of port 32. This prevents damage to the seal resulting from pressure extrusion of the seal into a port.

It can, therefore, be seen that two valves and two fluid pressurizing means are alternately arranged in bore 16, with the secondary pressurizing means being a floating piston positioned intermediate the two valve assemblies. A primary pressurizing chamber 150 is defined by a rearward portion of the wall of the bore 16 into which port 34 is connected, the forward end of primary piston 54, the rear end of floating piston 96, and portions of valve 80. A secondary pressurizing chamber 152 is similarly defined by the forward portion of the wall of bore 16 into which port 36 is connected, the forward end of floating piston 96, the end 26 of the bore 16, and portions of the valve assembly 130. In some of the appended claims, the secondary pressurizing chamber 152 is referred to as a first pressurizing chamber for purposes of orderly description, with the primary pressurizing chamber 150 being referred to as a secondary pressurizing chamber. In other claims the primary pressurizing chamber 150 may be referred to as a first pressurizing chamber and the secondary pressurizing chamber 152 may be referred to as the second pressurizing chamber. Similarly, for purpose of orderly description, the pistons 54 and 96 and the valves 80 and 130 may be referred to in the claims at times as either first or second pistons or pressurizing means and first or second valves.

When the system is in the released position shown, fluid is contained in the reservoir chambers 18 and 20, in the master cylinder chambers and passages, and in the brake lines. When the brake operator depresses the brake pedal 50, push rod 52 moves primary piston 54 forwardly against the force of spring 102 to begin pressurization of fluid in chamber 150. The valve retractor 70 is also moved forwardly, and valve 80 moves forwardly to seat the valve seal 90 against the seat 98, closing off the compensation connection with reservoir chamber 20 through port 32, groove 116, passage 118, and passage 94. Further movement of primary piston 54 further pressurizes fluid in pressurizing chamber 150. The force exerted by this pressure acting on the rear end of floating piston 96, as well as the force exerted through spring 102, moves piston 96 forwardly against the force of spring 126. Fluid pressurization is thus begun in chamber 152. Valve retractor 124 also moves forwardly, and spring 128 moves valve 130 with it until the valve seal 144 engages seat 146. This closes off the fluid compensation connection with reservoir chamber 18 through port 30 and passage 28. Thus pressurizing chamber 152 is also in condition to fully pressurize fluid. Further movement of the brake pedal 50 causes fluid pressurization in chambers 150 and 152 with the pressure in chamber 150 passing out port 34 and through front brake line 42 to actuate the front brakes 44. Fluid pressurized in chamber 152 passes out port 36 through rear brake line 46 to actuate the rear brakes 48.

When the brake pedal 50 is released, the reverse operation takes place. Spring 102 moves piston 54 and valve retractor 70 rearwardly. The valve retractor pulls valve 80 with it so that the valve seal 90 is unseated, thereby connecting chamber 150 with reservoir chamber 20 through the compensation connecting passages. Similarly, floating piston 96 moves to the right, or rearwardly, under the influence of spring 126, as does valve retractor 124. Valve 130 is unseated, thereby connecting chamber 152 with reservoir chamber 18 through the compensation connection passages.

If, for example, the front brake line 42 or any other portion of the front brake system fails, so that a brake line leak occurs, fluid may not be adequately pressurized in chamber 152 to cause actuation of floating piston 96. When such a condition occurs, piston 54 moves forwardly until its face 68 engages the rear end of valve 80. Since the valve is seated on its seat 98, a mechanical force transmission path is provided. Seal 90 may be compressed so that valve face 88 engages the rear end of piston 96 to transmit the relatively high mechanical forces necessary to actuate that piston. As an alternative, should it not be desirable to transmit such forces through the valve face, retractor 70 may be proportioned relative to the body of valve 80 so as to engage its flange 76 with seat 98 and thereby transmit part or all of these forces between the pistons. Further movement of the brake pedal will then move piston 96 mechanically to pressurize fluid in chamber 152 and actuate the rear brakes. It should be noted that when piston 96 reaches its maximum stroke at any time, the piston seal 108 is so positioned that it does not pass over the end of port 32. Similarly none of the seals at any time are permitted to pass over other ports, thereby obviating the problem of seal extrusion.

Should the rear brake line or its associated system fail so that fluid cannot be pressurized in chamber 152, the action of the master cylinder assembly will be as follows. Depression of the brake pedal 50 will cause the primary piston 54 to move to the left and valve 80 will be seated. The only resistance to movement of floating piston 96 would then be springs 126 and 128 which may be relatively easily overcome, thereby permitting little pressurization of fluid in chamber 150 at this point. Piston 96 will move forwardly until land 106 engages stop 148. Further movement of the piston is then prevented, and primary piston 54 can then pressurize fluid in chamber 150 to actuate the front brake system. A suitable recess 154 may be provided about valve seat 146 to receive valve retractor 124 so that full stroke of piston 96 is always permitted.

A master cylinder assembly has, therefore, been provided for split system operation which will permit the operation of one system even though the other system should fail. The master cylinder arrangement is such that no bypass holes are necessary, thereby permitting less expensive master cylinder manufacture and prevention of damage to seals therein. Each system which is pressurized by the master cylinder is fully compensated upon brake release. Should either pressurizing chamber be quickly released so that a subatmospheric pressure occurs therein, the atmospheric pressure acting on the end of the associated valve which is in fluid communication with the associated reservoir chamber will tend to open the valve more quickly, thereby resulting in quick and complete fluid compensation. The valves which control compensation are normally open in the release position and are closed by the pressurization of fluid in the pressurizing chambers as well as by spring force, and are under control of valve retractor mechanisms operatively connected with their associated pressurizing pistons.

What is claimed is:

1. A master cylinder assembly comprising:
   a body having a bore therein with a reduced area closed end and an open end, a fluid reservoir, a first port connecting the closed end of said bore with said reservoir, a second port connecting a center portion of said bore with said reservoir, and a first valve seat formed in said bore and positioned intermediate said ports;
   a first valve movable in said bore into and out of seating engagement with said first valve seat;
   a first piston movable in said bore and having an annular groove in selective fluid communication with said second port, said first piston cooperating with said bore and said first valve to define a first fluid pressurizing chamber;
   a second piston movable in said bore intermediate said first piston and said bore open end and cooperating with said bore and said first piston to define a second fluid pressurizing chamber;
   a recess in said first piston opening into said second fluid pressurizing chamber and in fluid communication with said first piston groove and having a second valve seat formed about the opening thereof at said second fluid pressurizing chamber;
   a second valve movable in said bore in said second fluid pressurizing chamber into and out of seating engagement with said second valve seat;
   a first spring urging said first valve and said first piston away from said first valve seat;
   a second spring urging said second valve and said second piston away from said second valve seat;
   a third spring urging said first valve and said first piston apart;
   a fourth spring urging said second valve and said second piston apart;
   a first pressurized fluid outlet for said first fluid pressurizing chamber;
   a second pressurized fluid outlet for said second fluid pressurizing chamber;
   and means including said fourth spring for moving said second piston and said second valve to seat said second valve on said second valve seat and pressurize fluid in said second fluid pressurizing chamber to move said first piston and said first valve to seat said first valve on said first valve seat and pressurize fluid in said first fluid pressurizing chamber.

2. A master cylinder having a pressure generator body with a bore formed therein,
   first and second fluid pressurizing means and first and second normally open compensating valve means alternately positioned in axial alignment in said bore to provide tandem arranged first and second fluid pressurizing chambers, pressurized fluid outlets for each of said fluid pressurizing chambers,
   first compressively yieldable force-transmitting means intermediate and mechanically interconnecting said first fluid pressurizing means and said first valve means, and second compressively yieldable force-transmitting means intermediate and mechanically interconnecting said second fluid pressurizing means and said second valve means, said first and second compressively yieldable force-transmitting means actuable upon respective pressurizing movements of said first and second fluid pressurizing means to exert forces on said first and second valve means to respectively close said valve means.

3. A master cylinder having a pressure generator body with a bore formed therein,
   first and second fluid pressurizing means and first and second normally open compensating valve means alternately positioned in axial alignment in said bore to provide tandem arranged first and second fluid pressurizing chambers, pressurized fluid outlets for each of said fluid pressurizing chambers,
   first valve retractor means interconnecting said first valve means and said first fluid pressurizing means and limiting to a predetermined maximum distance movement of said first valve means and said first fluid pressurizing means in opposed directions from each other, second valve retractor means interconnecting said second valve means and said second fluid pressurizing means and limiting to a predetermined maximum distance movement of said second valve means and said second fluid pressurizing means in opposed directions from each other, said first and second valve retractor means respectively holding said first and second valve means open when said first and second fluid pressurizing means are in fully released positions,
   and compressively loaded first and second spring means positioned respectively intermediate and mechanically interconnecting said first fluid pressurizing means and said first valve means and said second fluid pressurizing means and said second valve means and cooperating with said first and second valve retractor means to provide respective lost motion connections between said first valve means and said first pressurizing means and said second valve means and said second fluid pressurizing means.

4. A master cylinder having a pressure generator body with a bore formed therein,
   first and second fluid pressurizing means and first and second normally open compensating valve means alternately positioned in axial alignment in said bore to provide tandem arranged first and second fluid pressurizing chambers, pressurized fluid outlets for each of said fluid pressurizing chambers, compressively loaded first and second spring means positioned respectively intermediate and mechanically interconnecting said first fluid pressurizing means and said first valve means and said second fluid pressurizing means and said second valve means,
   said body having a stop limiting fluid pressurizing movement of said second fluid pressurizing means to provide fluid pressurizing reaction for said first fluid pressurizing means to pressurize fluid in said first fluid pressurizing chamber upon failure of said second fluid pressurizing means to pressurize fluid in said second fluid pressurizing chamber,
   said stop extending radially into said bore, said second fluid pressurizing means having first and second axially spaced lands defining a groove receiving said stop, said stop thereby establishing a maximum release position of said second fluid pressurizing means in cooperation with said first land and a maximum apply position of said second fluid pressurizing means in cooperation with said second land, said second fluid pressurizing means having an axially extending passage therein fluid connecting said groove and said first fluid pressurizing chamber and forming a valve seat portion of said first valve means;

said body having a fluid reservoir and a port interconnecting said reservoir and said groove, said second land closing said port when said stop is engaged by said second land.

5. A master cylinder assembly comprising
a body having a bore and a fluid reservoir and an annular valve seat provided in said bore in axial alignment therewith and a fluid compensating port fluid connecting
said reservoir and said valve seat,
an annular valve in said bore arranged in seating and unseating alignment with said seat,
a pressurizing piston in said bore in normally spaced relation to said valve and cooperating with said bore and said valve to provide a fluid pressurizing chamber,
a first spring acting on said valve seat and said piston, said first spring urging said piston away from said valve seat,
a second spring acting on said piston and said valve urging said valve away from said piston and toward said valve seat, and valve retractor means interconnecting said valve and said piston in lost motion relation and holding said valve away from said valve seat when said piston is not pressurizing fluid and permitting movement of said piston relative to said valve to pressurize fluid in said fluid pressurizing chamber when said valve is seated on said seat.

6. The master cylinder assembly of claim 5,
said valve having an axially grooved guide stem piloted within an axially extending portion of said fluid compensating port adjacent said valve seat.

References Cited by the Examiner
UNITED STATES PATENTS

| 2,332,301 | 10/1943 | Cox | 188—152.02 |
| 2,992,533 | 7/1961 | Hodkinson | 62—52 |
| 3,216,194 | 11/1965 | Yardley | 60—54.6 |

FOREIGN PATENTS

| 488,771 | 7/1938 | Great Britain. |
| 513,639 | 10/1939 | Great Britain. |

MARTIN P. SCHWADRON, *Primary Examiner.*

ROBERT R. BUNEVICH, *Examiner.*